United States Patent
Farah

(10) Patent No.: US 7,830,904 B1
(45) Date of Patent: *Nov. 9, 2010

(54) SYSTEM AND METHOD FOR MULTICHANNEL COMMUNICATION

(76) Inventor: Jeffrey J. Farah, 17 Princess Dr., North Brunswick, NJ (US) 08902

( * ) Notice: Subject to any disclaimer, the term of this patent is extended or adjusted under 35 U.S.C. 154(b) by 2428 days.

This patent is subject to a terminal disclaimer.

(21) Appl. No.: 10/318,083

(22) Filed: Dec. 13, 2002

Related U.S. Application Data

(63) Continuation of application No. 09/219,224, filed on Dec. 23, 1998, now Pat. No. 6,567,418.

(51) Int. Cl.
*H04J 3/17* (2006.01)

(52) U.S. Cl. ........................................ 370/419; 370/463

(58) Field of Classification Search .................. 370/335, 370/342, 436, 437, 441–443, 447, 465, 479, 370/537, 538, 540, 462, 463, 400, 401, 419–422; 709/223–226
See application file for complete search history.

(56) References Cited

U.S. PATENT DOCUMENTS

| | | | |
|---|---|---|---|
| 4,470,140 A * | 9/1984 | Coffey | 370/400 |
| 5,440,564 A | 8/1995 | Ovada et al. | |
| 5,546,400 A | 8/1996 | Hironaka | |
| 5,610,910 A * | 3/1997 | Focsaneanu et al. | 370/351 |
| 5,742,596 A * | 4/1998 | Baratz et al. | 370/356 |
| 5,930,340 A * | 7/1999 | Bell | 379/93.08 |
| 6,075,792 A * | 6/2000 | Ozluturk | 370/441 |
| 6,081,519 A * | 6/2000 | Petler | 370/356 |
| 6,081,536 A | 6/2000 | Gorsuch et al. | |
| 6,111,895 A | 8/2000 | Miller, II et al. | |
| 6,122,292 A | 9/2000 | Watanabe et al. | |
| 6,212,174 B1 | 4/2001 | Lomp et al. | |
| 6,333,928 B1 * | 12/2001 | Schaal et al. | 370/360 |
| 6,363,079 B1 * | 3/2002 | Barzegar et al. | 370/465 |
| 6,584,122 B1 * | 6/2003 | Matthews et al. | 370/493 |

\* cited by examiner

*Primary Examiner*—Pankaj Kumar
*Assistant Examiner*—Duc T Duong

(57) ABSTRACT

An internal network provides dynamically allocated bandwidths of up to 1.544 megabits/sec total over existing physical mediums such as twisted pairs. A line interface device connects to a local exchange carrier via a mux-demux unit that multiplexes communication signals for multiple channels of the internal network onto a single telephone line connection to the local exchange carrier. The line interface device allocates bandwidth amongst connected modem devices within the internal network according to device bandwidth needs. The modem devices are connected to each other and to the line interface device over the existing physical medium, for internal network transmission. Thus, high speed communications may be obtained without costly new physical medium installations. In this way, high connectivity may be obtained in a premises without large cost outlays.

12 Claims, 5 Drawing Sheets

FIG. 2

| | 102 | 104 | 106 | 108 | |
|---|---|---|---|---|---|
| 120 | 1 | PERSONAL COMPUTER 64 | 128 KB/s | DATA | ... |
| 122 | 2 | TELEPHONE STATION 68 | 64 KB/s | VOICE | ... |
| | ⋮ | ⋮ | ⋮ | ⋮ | ⋮ |
| 124 | N-1 | UPSTREAM CONTROL | 64 KB/s | DATA | ... |
| 126 | N | DOWNSTREAM CONTROL | 64 KB/s | DATA | ... |

100

SYSTEM AND METHOD FOR MULTICHANNEL COMMUNICATION

RELATED APPLICATIONS

This is a continuation of U.S. patent application Ser. No. 09/219,224, filed Dec. 23, 1998, now U.S. Pat. No. 6,567,418, issued May 26, 2003.

BACKGROUND OF THE INVENTION

1. Field of Invention

The invention relates to the field of communications, and more particularly to the delivery of dynamically allocated, combined voice and data streams over existing wiring, such as telephone wiring.

2. Description of Related Art

The increased demand for integrating communication devices, such as telephones, facsimile, and computers, has led to increasing requirements for networking capability within premises, such as an office or a home. Many offices and homes that include these devices would benefit from well-integrated networking. However, in these environments, it is usually not cost-effective to plan and install additional Ethernet or other network wiring to achieve high internal bandwidth. Therefore, there is a need for new technology to provide networks within environments such as the office or the home.

SUMMARY OF THE INVENTION

The invention relates to a system and method for multi-channel voice and data service which are transmitted over existing wiring. More particularly, a line interface device monitors and manages bandwidth demands over installed physical mediums such as twisted pair wiring for telephones or coaxial cable wirings for cable TV, for example, and multiplexes network data on the physical mediums using techniques such as CDMA (code division multiple access) techniques, for example. A single, high-rate bit stream is provided which may be entered or tapped by way of a conventional RJ-11 telephone outlet, for example. The network bandwidth may be distributed dynamically within the premises among devices that request network usage.

BRIEF DESCRIPTION OF THE DRAWINGS

The invention will be described with reference to the accompanying drawings, in which like elements are referenced with like numbers, and in which:

FIG. 2 is an exemplary diagram of a channel allocation database;

DETAILED DESCRIPTION OF PREFERRED EMBODIMENTS

Figure 1:
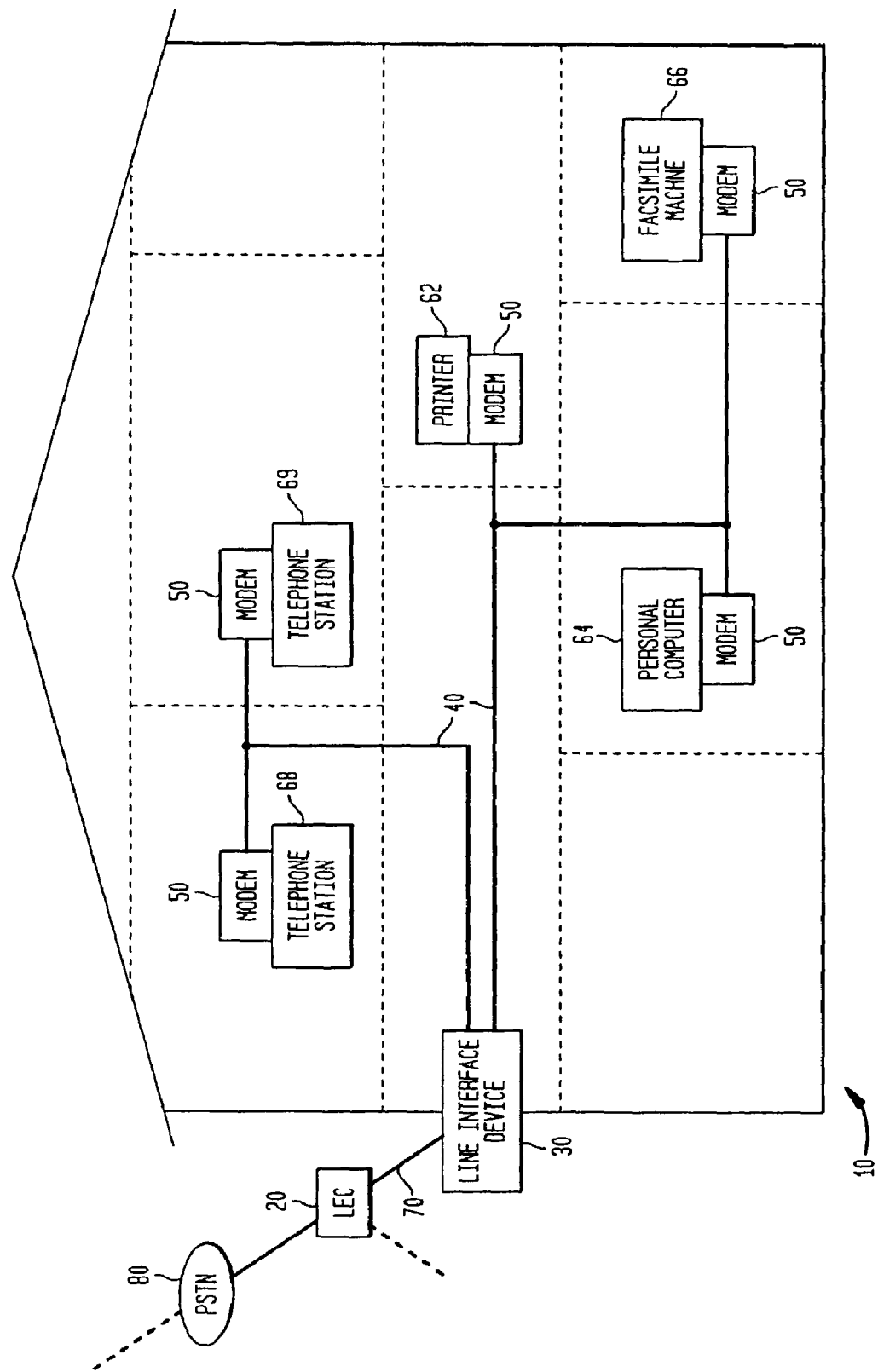
FIG. 1 is an exemplary diagram of a multi-channel system for a home.

FIG. 1 shows a home environment, as an example, where the home 10 is connected to a public switched telephone network (PSTN) 80 via a signal bus 70 and a local exchange carrier (LEC) 20. The home 10 contains a line interface device 30 that is an interface between the LEC 20 and an internal network within the home 10 that may include a physical medium 40 and modem devices 50 which are associated with various internal devices 62-69 within the home 10. The modem devices 50 may be devices described in co-pending U.S. patent application Ser. No. 08/943,312 filed Oct. 14, 1997, and 08/858,170 filed May 14, 1997, respectively. The above applications are assigned to the same assignee as this application and are hereby incorporated by reference.

The modem devices 50 as described in the aforesaid co-pending applications are CDMA modem units, capable of transmitting data at rates of up to 1.544 megabits/second over twisted copper pairs of the average home's telephone wiring. Modem devices 50 may contain a conventional RJ-11 outlet for connection to computer modems, facsimiles, printers or other equipment. The modem devices 50 may also be equipped with universal serial bus (USB), Integrated System Digital Network, (ISDN) or other standard data connectors, as will be appreciated by persons skilled in the art. However, other similar devices may be used that permit sharing of large bandwidths over mediums already installed.

The line interface device 30 is capable of dynamically channelizing the physical medium connections 40 into data channels of arbitrary bandwidth, so that the devices 62-69 which are connected to the modem devices 50 may be attached to the internal network controlled by the line interface device 30, and request throughput from the line interface device 30 as needed. For instance, the modem devices 50 may be connected to a printer 62, a personal computer 64, a facsimile machine 66 or telephone stations 68 and 69. Each of the devices 62-69 may be assigned a unique address to identify them within the internal network.

For example, if the total bandwidth available is 1.544 megabits per second, the line interface device 30 may divide the 1.544 megabits per second into 24 64 kbits per second channels. Each of the channels may be allocated as required to support the data transmission demands of the devices 62-69. The channel widths need not be the same as in the above example, but may be adjusted as the need arises. The line interface device 30 may reserve one or more channels for controlling the bandwidth allocation process.

For example, the line interface device 30 may allocated an upstream control channel and a downstream control channel. The upstream control channel is reserved for the modems 50 associated with each of the devices 62-69 for requesting bandwidth for data transmission. The downstream control channel may be reserved for the line interface device 30 to communicate with each of the modems 50 to indicate channel allocations, for example. Other channel allocation techniques may also be used as is well known in the art.

When one of the devices 62-69 requires bandwidth to transmit data to another device 62-69, the device 62-69 first sends an allocation request via the upstream control channel to the line interface device 30. The line interface device 30 returns a request response allocating one of the unused channels to the requesting device 62-69.

For example, if the personal computer 64 desires to print a document on the printer 62, the personal computer 64 first sends an allocation request to the line interface device 30 for a channel allocation. The line interface device 30 receives the allocation request and generates a request response based on the channels that are currently being used so that an unused channel may be assigned to the personal computer 64. When the personal computer 64 receives the request response is received, the personal computer 64 may output the document through the assigned channel to the printer 62 by formatting a header that includes the address of the printer 62 as the destination address. The printer 62 may respond to the print request by receiving the document sent by the personal computer 64 and printing the document as requested.

The allocation request may include information such as the requesting device address, the destination device address, the bandwidth desired and a type of transmission, such as voice or data. The destination address may be an internal device or an external device. If the destination address is for an internal device, the line interface device 30 may inform the addressed internal device of the channel request and forward the allocation information such as requesting device address, bandwidth and transmission type to the destination internal device. If the destination address is for an external device, the line interface device 30 may initialize an internal network interface to receive communication signals from the requesting device for sending to the external device and to forward communication signals received from the addressed external device to the requesting device.

The modems 50 may communicate with each other using various communication techniques using the channels provided by the line interface device 30. These communication techniques may include various protocols that are well know to one of ordinary skill in the art. For example, when the line interface device 30 assigns an unused channel to the personal computer 64, a message may be sent to the printer 62 at the same time to alert the printer 62 to listen for messages on the assigned channel. Thus, the printer 62 may be ready to receive the data transmitted by the personal computer 64. Other techniques such as having every modem 50 in the internal network listen to all the channels and respond whenever its address is a destination address of any of the messages being transmitted.

FIG. 2 shows an allocation database 100 of the line interface device 30 that may be used to allocate the channels. The allocation database 100 have entries 120, 122, 124 and 126. The entry 120 corresponds to channel 1; the entry 122 corresponds to channel 2; the entry 124 corresponds to channel n−1; and the entry 126 corresponds to channel n, where n is a positive integer. Each entry includes various fields 102-108 that relates to the channel allocation. For example, field 102 may correspond to the channel number; field 104 may correspond to the device to which the channel is assigned; field 106 may indicate the bandwidth that has been allocated to the channel; and field 108 may indicate the type of signals that is being transmitted (i.e., voice or data). Other fields may also be included to further specify and support various channel allocation schemes.

As an example, the entry 120 shows that channel 1, is allocated to the personal computer 64 having a bandwidth of 128 kbits per second and transmitting data. The entry 122 indicates that channel 2 is allocated to the telephone station 68 having a bandwidth of 64 kbits per second and transmitting voice. Channel n−1 and channel n are shown to be allocated to the upstream and downstream control channels, each having 64 kbits per second and transmitting data. Thus, when an allocation request for channel allocation is received, the line interface device 30 retrieves allocation database 100 and searches for an unallocated channel. When the allocation is completed, the allocation database 100 is updated with the new allocation information.

Figure 3:
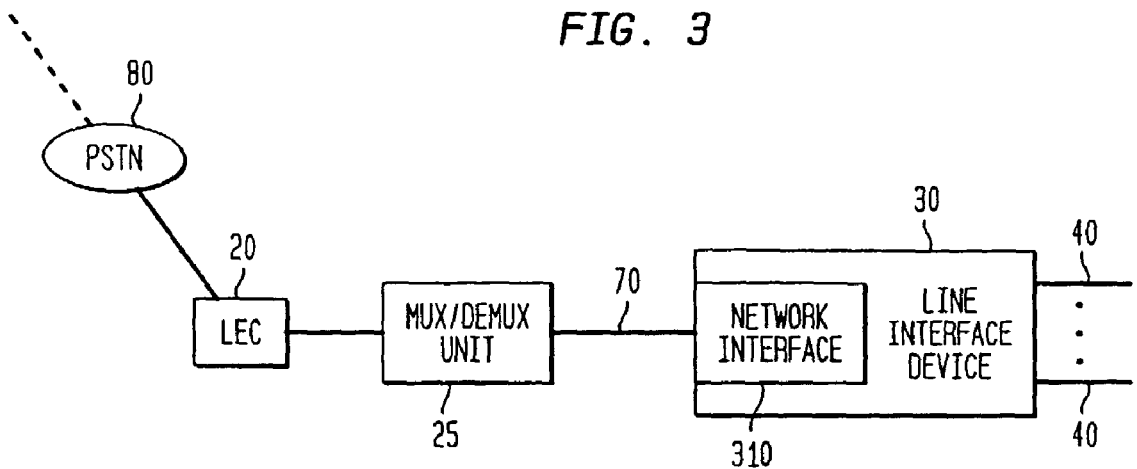
FIG. 3 is an exemplary diagram of a multiplexed connection between the home and a local exchange carrier.

As shown in FIG. 3, the line interface device 30 also provides the devices 62-69 access to the PSTN 80. A network interface 310 of the line interface device 30 multiplexes the signals received from the allocated channel of the internal network onto the signal bus 70 so that multiple channels may be obtained using a single telephone line connection, for example. The signal bus 70 may be a T1 line, for example, so that a plurality of conventional telephone lines may be multiplexed onto the single T1 line.

A mux-demux unit 25 may be provided at LEC 20 to demultiplex signals received from the network interface 310 for transmission through the LEC 20 and the PSTN 80. Communication signals received from multiple communicating parties through the PSTN 80 and the LEC 20 may be multiplexed by the mux-demux unit 25 onto the signal bus 70 and transmitted to the network interface 310 of the line interface device 30. The network interface 310 demultiplexes the received signals and retransmits the received signals in the allocated channels of the internal network to the respective devices 62-69.

Figure 4:
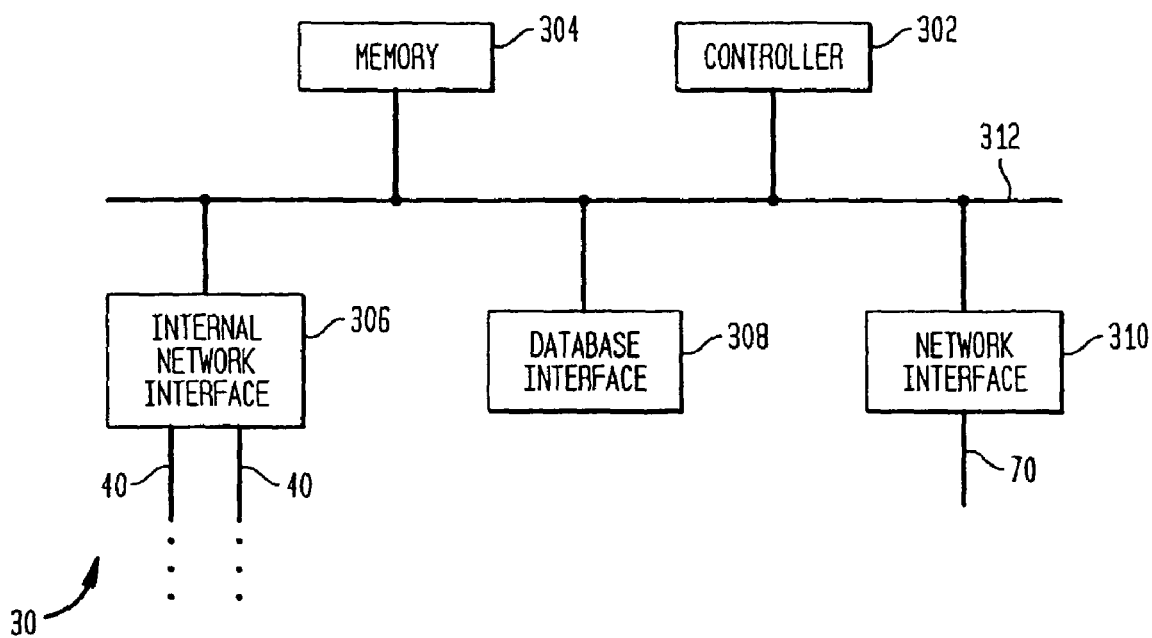
FIG. 4 is an exemplary diagram of a line interface device.

FIG. 4 shows a block diagram of the line interface device 30. The line interface device 30 includes a controller 302, a memory 304, an internal network interface 306, a database interface 308 and the network interface 310. The above components are coupled together via signal bus 312. The above architecture is exemplary only. Other architectures which are well known in the art may be used to accomplish the same purposes.

When an allocation request is received from one of the devices via one of the physical medium connections 40, the internal network interface 306 transmits the request to the controller 302 via the signal bus 312. In response, the controller 302 retrieves the allocation database 100 either from the memory 304 or from an external storage medium via the database interface 308. After an unused channel is identified, the controller 302 sends a request response message to the requesting device via the internal network interface 306 to complete the allocation of the identified unused channel. If the requesting device desires a connection to the PSTN 80, the controller 302 directs the internal network interface 306 to receive data transmitted by the device and to forward the transmitted data to the network interface 310 to be multiplexed onto the signal bus 70 and transmitted to the mux-demux unit 25. Communications signals received from the mux-demux unit 25 by the network interface 310 are directed to the internal network interface 306 to be transmitted to the respective devices.

Various control tables such as the allocation database 100 may be stored in the memory 304 or in the external storage medium via the database interface 308 to map the device identifications, the internal network channel assignments, and external communicating party addresses so that communication signals received from external devices may be properly routed to the appropriate internal device 62-69. For example, the entries 120-126 in the allocation database 100 may be further enhanced with additional fields that indicate telephone numbers of the communicating parties that are connected to the PSTN 80.

Figure 5:
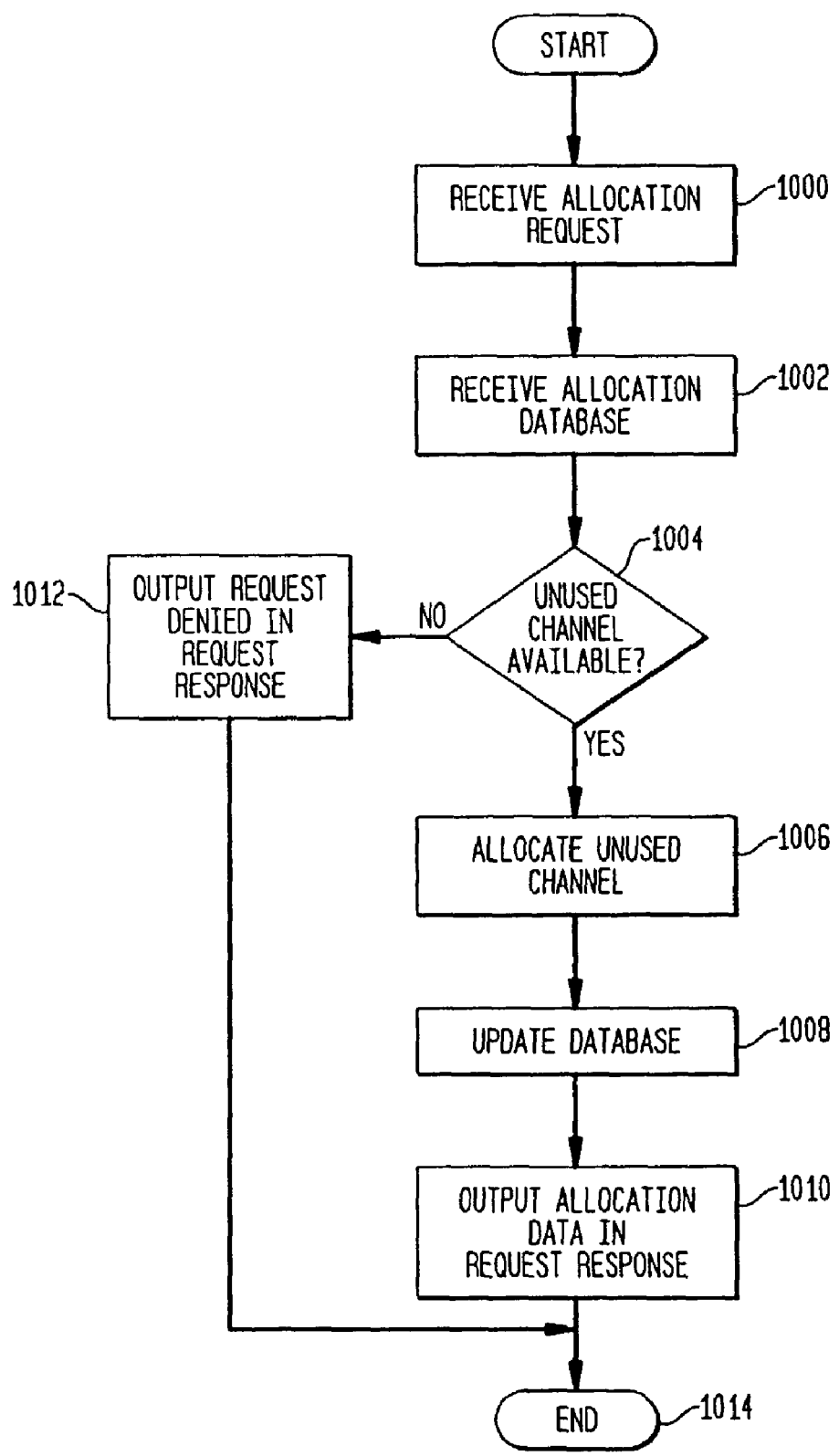
FIG. 5 is a flow chart of an exemplary channel allocation process.

FIG. 5 is a flowchart of a channel allocation process of the line interface device 30. In step 1000, the controller 302 receives an allocation request and goes to step 1002. In step 1002, the controller 302 retrieves the allocation database 100 from either the memory 304 or an external database through the database interface 308 and goes to step 1004. In step 1004, the controller 302 determines whether unused channels are available. If at least one unused channel is available, the controller 302 goes to step 1006; otherwise, the controller 302 goes to step 1012. In step 1012, the controller 302 outputs a request response to the requesting device indicating that no channels are currently available and goes to step 1014 to end the process.

In step 1006, the controller 302 allocates the unused channel and goes to step 1008. In step 1008, the controller 302 updates the allocation database 100 and goes to step 1010. In step 1010, the controller 302 outputs a request response to the requesting device indicating the channel number allocated to the requesting device and other allocation data and goes to step 1014 to end the process.

Figure 6:
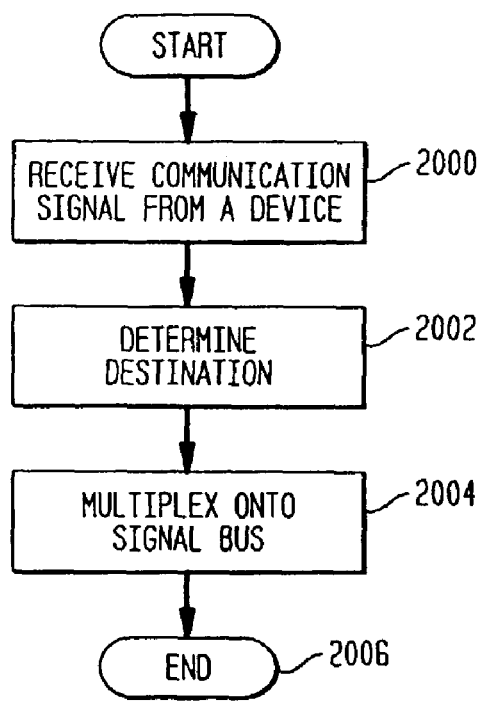
FIG. 6 is a flow chart of an exemplary process for connecting an internal device to the telephone network.

FIG. 6 shows an exemplary process of the line interface device 30 for transferring communication signals from devices 62-69 destined for external devices connected to the PSTN 80. In step 2000, the controller 302 receives the communication signals from an internal device 62-69 through the internal network interface 306 and goes to step 2002. In steps 2002, the controller 302 determines the destination of the communication signals either based on the information in the allocation database 100 or based on header information of the communication signals and goes to step 2004. For example, if the communication signals are in data packet form, each data packet may have a header that may include the destination address, as is well known in the art. In step 2004, the controller 302 sends the communication signals to the network interface 310 so that the communication signals may be multiplexed onto the signal bus 70 for transmission to the LEC 20 and the PSTN 80.

While the above describes transferring the communication signals from the internal network interface 306 to the controller 302 and then to the network interface 310, the data transfers may be directly between the internal network interface 306 and the network interface 310 with the controller 302 controlling the transfer. Alternatively, the controller 302 may initialize the internal network interface 306 and the network interface 310 when the internal device first initiates the communication with the external device so that the internal network interface 306 and the network interface 310 may operate automatically to bridge the internal device with the external party for communications.

Figure 7:
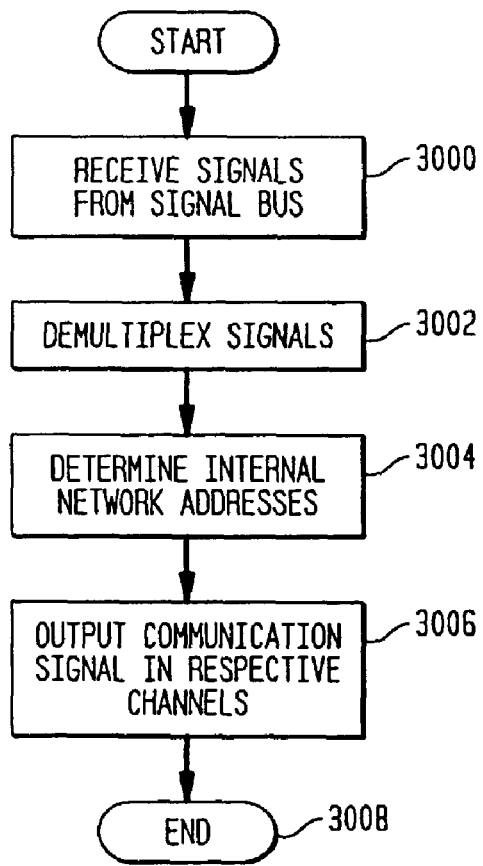
FIG. 7 is a flow chart of an exemplary process for receiving communication signals destined to an internal device.

FIG. 7 shows a process of the line interface device 30 for receiving signals from the signal bus 70 and sending the communication signals to the appropriate internal device 62-69. In step 3000, the network interface 310 receives communication signals from the signal bus 70 and the process goes to step 3002. In step 3002, the network interface 310 demultiplexes the received communication signals and sends the communication signals to the controller 302 and the process goes to step 3004.

In step 3004, the controller 302 determines the internal network addresses corresponding to each of the communication signals either via headers in the communication signals or based on the allocation database 100 and goes to step 3006. In step 3006, the controller 302 sends the signals to the internal network interface 306 to output each of the communication signals in the appropriate channels that has been allocated for the particular communications and goes to step 3008 to end the process. As before, the signals received by the network interface 310 may be sent directly to the internal network interface 306 either based on control signals from the controller 302 or based on prior initializations when the communications were first established.

The invention thus establishes a dynamically allocated set of data channels within a premises such as a home or an office using only existing physical mediums connections 40 without further wiring required. The network architecture is not limited to the central control scheme via the line interface device 30, but other communication medium allocation schemes may also be used.

It will be understood that while the invention has been described in terms of individual data devices such as computers 64, printers 62 and facsimile machines 66 connected to the physical medium connections 40 through line interface 30 and ultimately to the LEC 20, other configurations and communications services are contemplated. For instance, the line interface 30 may connect to coaxial cable television connections, ASDL, ISDN or other high-speed links in addition to the common house telephone connection.

The line interface device 30 is capable of assimilating the data from the physical medium connections 40 and presenting them at a data rate expected by the appropriate connection to the LEC 20. Thus, connection of devices to the modem devices 50 within the home is transparent to the user, regardless of the type of outside data link.

The foregoing description of the invention is illustrative, and variations in configuration and implementation will occur to persons skilled in the art. For instance, while the data rate of connections over physical medium connections 40 has been described as T1 rates of 1.544 megabits/sec, other data rates are possible. For instance, the use of two physical medium connections might be employed to achieve a 2× data rate. Similarly, while modem devices 50 are described as operating using a CDMA modulation technique, other techniques will be possible.

The various components of the line interface device 30 may be implemented by technology known to those skilled in the art. For example, the memory 304 may be implemented using RAM, EEPROM, etc. Also, application specific integrated circuits (ASIC) may be used for the controller, the internal network interface 306, the database interface 308 or the network interface 310. Other well known hardware implementations such a PLA, PLD, etc. may also be used.

Thus, while this invention has been described in conjunction with specific embodiments thereof, it is evident that many alternatives, modifications, and variations will be apparent to those skilled in the art. Accordingly, preferred embodiments of the invention as set forth herein are intended to be illustrative not limiting. Various changes may be made without departing from the spirit and scope of the invention.

What is claimed is:

1. A method that provides for communication among a plurality of devices internal to a premises (internal devices) over an existing physical medium of a premises, which medium comprises communication channels, as well as communication between the internal devices and devices external to said premises (external devices) via an external network, comprising:

receiving, at an interface device that is interposed between said physical medium and said external network, an allocation request from one of said internal devices, which request includes a requested bandwidth for communicating with another of said internal devices over one of said channels without use of said external network;

when a channel based on the allocation request can be allocated on said physical medium, to coexist with channels already allocated, allocating said channel to said one of said internal devices based on the allocation request;

retrieving allocation data from an allocation database;

identifying an unused channel that satisfies said allocation request; and sending a request response to the internal device that sent the allocation request.

2. A method executed in a line interface module, for enabling communication among a plurality of internal devices over an existing physical medium of a premises as well as communicating between the internal devices and external devices on an external network that is coupled to said, comprising:
 receiving an allocation request from an internal device, which request includes an identification of a destination device, a data transmission type, and a bandwidth;
 if capacity is available, allocating a channel to the internal device based on the allocation request, and informing said internal device of the allocation;
 if the destination device is an external device reachable only through the external network, the method further comprises:
 receiving first communication signals from the internal device;
 multiplexing the first communication signals onto a single signal bus; and
 transmitting the multiplexed first communication signals to the external device through the external network
 receiving second communication signals from the external network;
 demultiplexing the second communication signals;
 extracting an internal destination address from the demultiplexed second communication signals; and
 transmitting the demultiplexed communication signals to an internal device that corresponds to the internal destination address.

3. The method of claim 2, further comprising:
 retrieving the allocation database;
 identifying an allocated channel that corresponds to the internal destination address; and
 transmitting the demultiplexed communication signals through the allocated channel.

4. A line interface device that provides communication among a plurality of internal devices over an existing physical medium of a premises and provides communication between the internal devices and external devices via an external network, comprising:
 an internal network interface;
 an external network interface; and
 a controller coupled to the internal network interface and the external network interface, the controller providing a plurality of channels on the existing physical medium, receiving an allocation request from an internal device for communicating with another internal device without the use of said external network, and allocating one of the channels to the internal device based on the allocation request;
 wherein the controller retrieves allocation data from an allocation database, identifies an unused channel of the plurality of channels, and sends a request response to the internal device.

5. The device of claim 4, wherein the allocation request includes an identification of a destination device, a data transmission type and a bandwidth.

6. The device of claim 4, wherein the internal devices include modems that support code division multiple access protocol and the multiplexed connection supports at least one of time division multiple access and frequency division multiple access protocols.

7. The device of claim 4, wherein the existing physical medium is one of a twisted pair and a coaxial cable.

8. The device of claim 4, wherein data may be transmitted on physical medium at a rate of 1.544 megabits per second.

9. A line interface device that provides communication among a plurality of internal devices over an existing physical medium of a premises and provides communication between the internal devices and external devices via an external network, comprising:
 an internal network interface;
 a network interface; and
 a controller coupled to the internal network interface and the network interface, the controller providing a plurality of channels on the existing physical medium, receiving an allocation request from an internal device, and allocating one of the channels to the internal device based on the allocation request
 wherein the controller retrieves allocation data from an allocation database, identifies an unused channel of the plurality of channels, and sends a request response to the internal device;
 wherein the allocation request includes an identification of a destination device, a data transmission type and a bandwidth; and
 wherein if the destination device is another internal device, the controller sends to the destination device a message indicating an identification of the requesting internal device and a channel that has been allocated.

10. A line interface device that provides communication among a plurality of internal devices over an existing physical medium of a premises and provides communication between the internal devices and external devices via an external network, comprising:
 an internal network interface;
 a network interface; and
 a controller coupled to the internal network interface and the network interface, the controller providing a plurality of channels on the existing physical medium, receiving an allocation request from an internal device, and allocating one of the channels to the internal device based on the allocation request
 wherein the controller retrieves allocation data from an allocation database, identifies an unused channel of the plurality of channels, and sends a request response to the internal device;
 wherein the allocation request includes an identification of a destination device, a data transmission type and a bandwidth; and
 wherein if the destination device is an external device reachable only through the external network, the network interface receives first communication signals from the internal device, multiplexes the first communication signals onto a single signal bus, and transmits the multiplexed first communication signals to the external device through the external network.

11. The device of claim 10, wherein the network interface receives second communication signals from the external network, demultiplexes the second communication signals, and extracts an internal destination address from the demultiplexed second communication signals, the communication signals being sent to the internal network interface that transmits the demultiplexed communication signals to an internal device that corresponds to the internal destination address.

12. The device of claim 11, wherein the controller retrieves allocation data from the allocation database, identifies an allocated channel that corresponds to the internal destination address, and instructs the internal network interface to transmit the demultiplexed communication signals through the allocated channel.

* * * * *